United States Patent
Lin et al.

(10) Patent No.: US 10,523,396 B2
(45) Date of Patent: Dec. 31, 2019

(54) METHOD AND APPARATUS FOR TRANSMITTING WIRELESS LOCAL AREA NETWORK INFORMATION

(71) Applicant: HUAWEI TECHNOLOGIES CO., LTD., Shenzhen (CN)

(72) Inventors: Meilu Lin, Shenzhen (CN); Ming Gan, Shenzhen (CN); Le Liu, Shenzhen (CN); Jun Zhu, Shanghai (CN); Jian Yu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/362,603

(22) Filed: Mar. 22, 2019

(65) Prior Publication Data

US 2019/0222392 A1 Jul. 18, 2019

Related U.S. Application Data

(63) Continuation of application No. 15/908,866, filed on Mar. 1, 2018, which is a continuation of application No. PCT/CN2016/097646, filed on Aug. 31, 2016.

(30) Foreign Application Priority Data

Sep. 1, 2015 (CN) .......................... 2015 1 0555654

(51) Int. Cl.
*H04L 5/00* (2006.01)
*H04W 28/06* (2009.01)
(Continued)

(52) U.S. Cl.
CPC .............. *H04L 5/0053* (2013.01); *H04L 5/00* (2013.01); *H04L 5/0091* (2013.01);
(Continued)

(58) Field of Classification Search
None
See application file for complete search history.

(56) References Cited

U.S. PATENT DOCUMENTS

2007/0265016 A1 11/2007 Kahtava et al.
2011/0032875 A1 2/2011 Erceg et al.
(Continued)

FOREIGN PATENT DOCUMENTS

CN 101849423 A 9/2010
CN 103002505 A 3/2013
(Continued)

OTHER PUBLICATIONS

Qualcomm Incorporated: "Multi-carrier LBT operation", 3GPP TSG RAN WG1 #82, R1-153868, Aug. 24th-28th, 2015, Beijing, China, total 6 pages.

*Primary Examiner* — Steven H Nguyen
(74) *Attorney, Agent, or Firm* — Kilpatrick Townsend & Stockton LLP

(57) ABSTRACT

A method for sending a wireless local area network packet structure is provided, and the method comprises: determining a packet structure, where the packet structure comprises an HE-SIGA and an HE-SIGB, the HE-SIGA comprises an indication information, and if a current transmission mode is a full bandwidth MU-MIMO transmission, the indication information is used to indicate a number of scheduled users, or if the current transmission mode is other transmission mode, the indication information is used to indicate a number of symbols in the HE-SIGB; and sending the packet structure.

20 Claims, 21 Drawing Sheets

(51) Int. Cl.
*H04W 28/18* (2009.01)
*H04W 72/12* (2009.01)
*H04W 84/12* (2009.01)
*H04W 72/04* (2009.01)
*H04W 74/00* (2009.01)

(52) U.S. Cl.
CPC .......... *H04W 28/06* (2013.01); *H04W 28/18* (2013.01); *H04W 72/121* (2013.01); *H04W 72/1289* (2013.01); *H04L 5/0005* (2013.01); *H04L 5/0007* (2013.01); *H04L 5/0037* (2013.01); *H04W 72/0446* (2013.01); *H04W 74/006* (2013.01); *H04W 84/12* (2013.01)

(56) References Cited

U.S. PATENT DOCUMENTS

| | | |
|---|---|---|
| 2012/0182980 A1 | 7/2012 | Abraham |
| 2012/0327915 A1 | 12/2012 | Kang et al. |
| 2013/0137433 A1 | 5/2013 | Ahluwalia |
| 2013/0286959 A1 | 10/2013 | Lou et al. |
| 2013/0301551 A1 | 11/2013 | Ghosh et al. |
| 2014/0050211 A1 | 2/2014 | Kim et al. |
| 2014/0307612 A1 | 10/2014 | Vermani et al. |
| 2014/0369276 A1 | 12/2014 | Porat et al. |
| 2015/0117427 A1 | 4/2015 | Park et al. |
| 2016/0044676 A1* | 2/2016 | Choi .................. H04W 72/1289 370/329 |
| 2016/0081090 A1 | 3/2016 | Jung et al. |
| 2016/0360528 A1 | 12/2016 | Kim et al. |
| 2017/0013092 A1* | 1/2017 | Chen ........................ H04L 5/003 |
| 2017/0222769 A1* | 8/2017 | Li .......................... H04L 5/0023 |
| 2017/0280462 A1 | 9/2017 | Chun et al. |
| 2018/0109300 A1 | 4/2018 | Choi et al. |
| 2018/0124750 A1 | 5/2018 | Jung et al. |

FOREIGN PATENT DOCUMENTS

| | | |
|---|---|---|
| CN | 103004122 A | 3/2013 |
| CN | 103561440 A | 2/2014 |
| CN | 104272605 A | 1/2015 |
| CN | 104321998 A | 1/2015 |
| CN | 104735675 A | 6/2015 |
| GB | 2543698 A | 4/2017 |
| WO | 2011108832 A3 | 1/2012 |
| WO | 2015064943 A1 | 5/2015 |
| WO | 2015119374 A1 | 8/2015 |
| WO | 2016028124 A1 | 2/2016 |

* cited by examiner

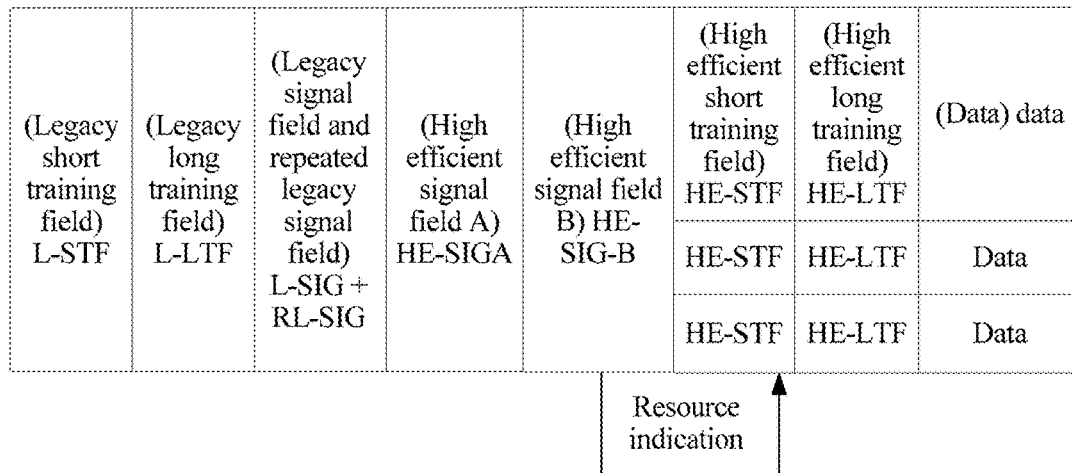
FIG. 5
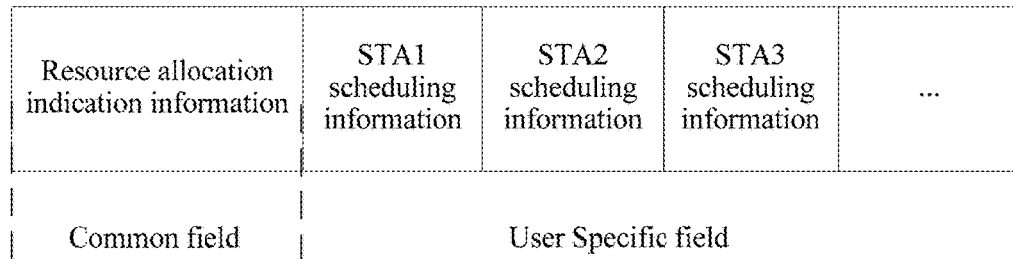
FIG. 6
| Resource allocation indication information | STA1 scheduling information | STA2 scheduling information | STA3 scheduling information | ... |
|---|---|---|---|---|
| Common field | User Specific field | | | |
FIG. 7

| Arrangement Index | #1 | #2 | #3 | #4 | #5 | #6 | #7 | #8 | #9 |
|---|---|---|---|---|---|---|---|---|---|
| 1 | 26 | 26 | 26 | 26 | 26 | 26 | 26 | 26 | 26 |
| 2 | 52 | 26 | 52 | 26 | 26 | 26 | 26 | 26 | 26 |
| 3 | 26 | 26 | 26 | 26 | 26 | 26 | 26 | 52 | 26 |
| 4 | 26 | 26 | 26 | 26 | 26 | 52 | 26 | 26 | 26 |
| 5 | 26 | 26 | 26 | 26 | 26 | 26 | 52 | 26 | 26 |
| 6 | 52 | 26 | 52 | 26 | 26 | 26 | 26 | 52 | 26 |
| 7 | 52 | 26 | 26 | 26 | 26 | 52 | 26 | 26 | 26 |
| 8 | 52 | 26 | 52 | 26 | 26 | 26 | 52 | 26 | 26 |
| 9 | 26 | 26 | 52 | 26 | 26 | 52 | 26 | 52 | 26 |
| 10 | 26 | 26 | 26 | 26 | 26 | 26 | 26 | 26 | 26 |
| 11 | 26 | 26 | 26 | 26 | 26 | 52 | 26 | 26 | 26 |
| 12 | 102 | | | | 26 | 26 | 26 | 26 | 26 |
| 13 | 26 | 26 | 26 | 26 | 26 | 102 | | | |
| 14 | 102 | | | | 26 | 52 | 26 | 26 | 26 |
| 15 | 102 | | | | 26 | 26 | 26 | 52 | 26 |
| 16 | 102 | | | | 26 | 52 | 26 | 52 | 26 |
| 17 | 52 | | 26 | | 26 | 102 | | | |
| 18 | 26 | 26 | 52 | 26 | 26 | 102 | | | |
| 19 | 52 | | 52 | | 26 | 102 | | | |
| 20 | 102 | | | | 26 | 102 | | | |
| 21 | 52 | | 52 | | 26 | 52 | 26 | 26 | 26 |
| 22 | 52 | | 52 | | 26 | 52 | 26 | 52 | 26 |
| 23 | 52 | | 52 | | 26 | 26 | 26 | 52 | 26 |
| 24 | 52 | | 26 | 26 | 26 | 52 | 26 | 52 | 26 |
| 25 | 26 | 26 | 52 | | 26 | 52 | | 52 | |

FIG. 8

| STA ID/ PAID (station identifier) | Nsts (number of space-time streams) | TxBF (beamforming) | STBC (space time block code) | MCS (modulation and coding scheme) | Coding (coding manner) |
|---|---|---|---|---|---|

FIG. 10a

| STA ID/PAID (station identifier) | First stream index (location of the first space and time stream) | Nsts (number of space-time streams) | MCS (modulation and coding scheme) | Coding (coding manner) |
|---|---|---|---|---|

FIG. 10b

| (Legacy short training field) L-STF | (Legacy long training field) L-LTF | (Legacy signal field and repeated legacy signal Field) L-SIG + RL-SIG | (High efficient signal Field A) HE-SIGA | (High efficient signal Field B) HE-SIG-B | (High efficient short training field) HE-STF | (High efficient long training field) HE-LTF | (Data) data |
|---|---|---|---|---|---|---|---|
| | | | | | HE-STF | HE-LTF | Data |
| L-STF | L-LTF | L-SIG+ RL-SIG | HE-SIGA | HE-SIG-B | HE-STF | HE-LTF | Data |
| | | | | | HE-STF | HE-LTF | Data |
| | | | | | HE-STF | HE-LTF | Data |
| L-STF | L-LTF | L-SIG+ RL-SIG | HE-SIGA | HE-SIG-B | | | |
| | | | | | HE-STF | HE-LTF | Data |
| L-STF | L-LTF | L-SIG+ RL-SIG | HE-SIGA | HE-SIG-B | | | |

FIG. 11

| Common Field | User Specific Field | | |
|---|---|---|---|
| Resource allocation indication information at a first and a third 20 MHz | STA1 scheduling information | STA2 scheduling information | ... |
| Resource allocation indication information at a second and a fourth 20 MHz | STA1 scheduling information | STA2 scheduling information | ... |
| Resource allocation indication information at the first and the third 20 MHz | STA1 scheduling information | STA2 scheduling information | ... |
| Resource allocation indication information at the second and the fourth 20 MHz | STA1 scheduling information | STA2 scheduling information | ... |

FIG. 12

| SIGA: For non-OFDMA, number of scheduled users is 4 | STA1 scheduling information | STA2 scheduling information | |
|---|---|---|---|
| SIGA: For non-OFDMA, number of scheduled users is 4 | STA3 scheduling information | STA4 scheduling information | HE-STF HE-LTF four-user MU-MIMO |
| SIGA: For non-OFDMA, number of scheduled users is 4 | STA1 scheduling information | STA2 scheduling information | |
| SIGA: For non-OFDMA, number of scheduled users is 4 | STA3 scheduling information | STA4 scheduling information | |

FIG. 13

| RA-1 and RA-3 | STA1 scheduling information | STA2 scheduling information | STA3 scheduling information | STA4 scheduling information | STA5 scheduling information | STA6 scheduling information | HE-STF HE-LTF four-user MU-MIMO |
| RA-2 and RA-4 | STA1 scheduling information | STA2 scheduling information | STA3 scheduling information | STA4 scheduling information | STA5 scheduling information | STA6 scheduling information | |
| RA-1 and RA-3 | STA1 scheduling information | STA2 scheduling information | STA3 scheduling information | STA4 scheduling information | STA5 scheduling information | STA6 scheduling information | HE-STF HE-LTF one user / HE-STF HE-LTF one user / HE-STF HE-LTF one user / HE-STF HE-LTF one user / HE-STF HE-LTF one user / HE-STF HE-LTF one user |
| RA-2 and RA-4 | STA1 scheduling information | STA2 scheduling information | STA3 scheduling information | STA4 scheduling information | STA5 scheduling information | STA6 scheduling information | HE-STF HE-LTF two-user MU-MIMO |

FIG. 14

| RA-1 and RA-3 | STA1 scheduling information | STA2 scheduling information | STA3 scheduling information | STA4 scheduling information | STA5 scheduling information | STA6 scheduling information | STA7 scheduling information | HE-STF HE-LTF four-user MU-MIMO |
| --- | --- | --- | --- | --- | --- | --- | --- | --- |
| RA-2 and RA-4 | STA1 scheduling information | STA2 scheduling information | STA3 scheduling information | STA4 scheduling information | STA5 scheduling information | | | |
| RA-1 and RA-3 | STA1 scheduling information | STA2 scheduling information | STA3 scheduling information | STA4 scheduling information | STA5 scheduling information | STA6 scheduling information | STA7 scheduling information | HE-STF HE-LTF one user
HE-STF HE-LTF one user
HE-STF HE-LTF one user
HE-STF HE-LTF one user
HE-STF HE-LTF one user
HE-STF HE-LTF one user |
| RA-2 and RA-4 | STA1 scheduling information | STA2 scheduling information | STA3 scheduling information | STA4 scheduling information | STA5 scheduling information | | | HE-STF HE-LTF two-user MU-MIMO |

FIG. 15

| BW bandwidth | BSS color basic service set color identifier | #sym HE-SIGB quantity of symbols in an HE-SIGB | MCS of HE-SIGB modulation and coding scheme | HE-SIGA CRC cyclic redundancy code in a SIGA | Quantity of pieces of RA included in a common domain of an HE-SIGB | To-be-determined TBD |
|---|---|---|---|---|---|---|

FIG. 16

| | | | |
|---|---|---|---|
| SIGA: Quantity of pieces of RA included in a common domain of an HE-SIGB = 0 | STA1 scheduling information | STA2 scheduling information | |
| SIGA: Quantity of pieces of RA included in a common domain of an HE-SIGB = 0 | STA1 scheduling information | STA2 scheduling information | HE-STF HE-LTF four-user MU-MIMO |
| SIGA: Quantity of pieces of RA included in a common domain of an HE-SIGB = 0 | STA1 scheduling information | STA2 scheduling information | |
| SIGA: Quantity of pieces of RA included in a common domain of an HE-SIGB = 0 | STA1 scheduling information | STA2 scheduling information | |

FIG. 17

| SIGA: Quantity of pieces of RA included in a common domain of an HE-SIGB = 1 | RA-1 | STA1 scheduling information | STA2 scheduling information | STA3 scheduling information | STA4 scheduling information | HE-STF HE-LTF four-user MU-MIMO |
|---|---|---|---|---|---|---|
| SIGA: Quantity of pieces of RA included in a common domain of an HE-SIGB = 1 | RA-4 | STA1 scheduling information | STA2 scheduling information | STA3 scheduling information | | |
| SIGA: Quantity of pieces of RA included in a common domain of an HE-SIGB = 1 | RA-1 | STA1 scheduling information | STA2 scheduling information | STA3 scheduling information | STA4 scheduling information | HE-STF HE-LTF three-user MU-MIMO |
| SIGA: Quantity of pieces of RA included in a common domain of an HE-SIGB = 1 | RA-4 | STA1 scheduling information | STA2 scheduling information | STA3 scheduling information | | |

FIG. 18

| SIGA: OFDMA | RA-1 and RA-3 | STA1 scheduling information | STA2 scheduling information | STA3 scheduling information | STA4 scheduling information | HE-STF HE-LTF four-user MU-MIMO |
|---|---|---|---|---|---|---|
| SIGA: OFDMA | RA-2 and RA-4 | STA1 scheduling information | STA2 scheduling information | STA3 scheduling information | | |
| SIGA: OFDMA | RA-1 and RA-3 | STA1 scheduling information | STA2 scheduling information | STA3 scheduling information | STA4 scheduling information | HE-STF HE-LTF three-user MU-MIMO |
| SIGA: OFDMA | RA-2 and RA-4 | STA1 scheduling information | STA2 scheduling information | STA3 scheduling information | | |

FIG. 19

| SIGA: Quantity of pieces of RA included in a common domain of an HE-SIGB = 2 | STA1 scheduling information | STA2 scheduling information | STA3 scheduling information | STA4 scheduling information | STA5 scheduling information | STA6 scheduling information | HE-STF HE-LTF four-user MU-MIMO |
|---|---|---|---|---|---|---|---|
| RA-1 and RA-3 | | | | | | | |
| SIGA: Quantity of pieces of RA included in a common domain of an HE-SIGB = 2 | STA1 scheduling information | STA2 scheduling information | STA3 scheduling information | STA4 scheduling information | STA5 scheduling information | STA6 scheduling information | |
| RA-2 and RA-4 | | | | | | | |
| SIGA: Quantity of pieces of RA included in a common domain of an HE-SIGB = 2 | STA1 scheduling information | STA2 scheduling information | STA3 scheduling information | STA4 scheduling information | STA5 scheduling information | STA6 scheduling information | HE-STF HE-LTF one user / HE-STF HE-LTF one user / HE-STF HE-LTF one user / HE-STF HE-LTF one user / HE-STF HE-LTF one user / HE-STF HE-LTF one user |
| RA-1 and RA-3 | | | | | | | |
| SIGA: Quantity of pieces of RA included in a common domain of an HE-SIGB = 2 | STA1 scheduling information | STA2 scheduling information | STA3 scheduling information | STA4 scheduling information | STA5 scheduling information | STA6 scheduling information | HE-STF HE-LTF two-user MU-MIMO |
| RA-2 and RA-4 | | | | | | | |

FIG. 20

| SIGA: Quantity of pieces of RA included in a common domain of an HE-SIGB = 2 | RA-1 and RA-3 | STA1 scheduling information | STA2 scheduling information | STA3 scheduling information | STA4 scheduling information | STA5 scheduling information | STA6 scheduling information | STA7 scheduling information | HE-STF HE-LTF four-user MU-MIMO |
|---|---|---|---|---|---|---|---|---|---|
| SIGA: Quantity of pieces of RA included in a common domain of an HE-SIGB = 2 | RA-6 and RA-8 | STA1 scheduling information | STA2 scheduling information | STA3 scheduling information | STA4 scheduling information | STA5 scheduling information | STA6 scheduling information | | |
| SIGA: Quantity of pieces of RA included in a common domain of an HE-SIGB = 2 | RA-1 and RA-3 | STA1 scheduling information | STA2 scheduling information | STA3 scheduling information | STA4 scheduling information | STA5 scheduling information | STA6 scheduling information | STA7 scheduling information | HE-STF HE-LTF three-user MU-MIMO |
| SIGA: Quantity of pieces of RA included in a common domain of an HE-SIGB = 2 | RA-6 and RA-8 | STA1 scheduling information | STA2 scheduling information | STA3 scheduling information | STA4 scheduling information | STA5 scheduling information | STA6 scheduling information | | |
| SIGA: Quantity of pieces of RA included in a common domain of an HE-SIGB = 2 | RA-1 and RA-3 | STA1 scheduling information | STA2 scheduling information | STA3 scheduling information | STA4 scheduling information | STA5 scheduling information | STA6 scheduling information | STA7 scheduling information | HE-STF HE-LTF three-user MU-MIMO |
| SIGA: Quantity of pieces of RA included in a common domain of an HE-SIGB = 2 | RA-6 and RA-8 | STA1 scheduling information | STA2 scheduling information | STA3 scheduling information | STA4 scheduling information | STA5 scheduling information | STA6 scheduling information | | |
| SIGA: Quantity of pieces of RA included in a common domain of an HE-SIGB = 2 | RA-1 and RA-3 | STA1 scheduling information | STA2 scheduling information | STA3 scheduling information | STA4 scheduling information | STA5 scheduling information | STA6 scheduling information | STA7 scheduling information | HE-STF HE-LTF three-user MU-MIMO |
| SIGA: Quantity of pieces of RA included in a common domain of an HE-SIGB = 2 | RA-6 and RA-8 | STA1 scheduling information | STA2 scheduling information | STA3 scheduling information | STA4 scheduling information | STA5 scheduling information | STA6 scheduling information | | |

FIG. 21

| SIGA: Quantity of pieces of RA included in a common domain of an HE-SIGB = 2 | RA-1 and RA-3 | STA1 scheduling information | STA2 scheduling information | STA3 scheduling information | STA4 scheduling information | STA5 scheduling information | STA6 scheduling information | STA7 scheduling information | HE-STF HE-LTF four-user MU-MIMO |
| SIGA: Quantity of pieces of RA included in a common domain of an HE-SIGB = 2 | RA-4 and RA-6 | STA1 scheduling information | STA2 scheduling information | STA3 scheduling information | STA4 scheduling information | STA5 scheduling information | STA6 scheduling information | | |
| SIGA: Quantity of pieces of RA included in a common domain of an HE-SIGB = 2 | RA-1 and RA-3 | STA1 scheduling information | STA2 scheduling information | STA3 scheduling information | STA4 scheduling information | STA5 scheduling information | STA6 scheduling information | STA7 scheduling information | HE-STF HE-LTF three-user MU-MIMO |
| SIGA: Quantity of pieces of RA included in a common domain of an HE-SIGB = 2 | RA-4 and RA-6 | STA1 scheduling information | STA2 scheduling information | STA3 scheduling information | STA4 scheduling information | STA5 scheduling information | STA6 scheduling information | | HE-STF HE-LTF three-user MU-MIMO |
| SIGA: Quantity of pieces of RA included in a common domain of an HE-SIGB = 2 | RA-1 and RA-3 | STA1 scheduling information | STA2 scheduling information | STA3 scheduling information | STA4 scheduling information | STA5 scheduling information | STA6 scheduling information | STA7 scheduling information | |
| SIGA: Quantity of pieces of RA included in a common domain of an HE-SIGB = 2 | RA-4 and RA-6 | STA1 scheduling information | STA2 scheduling information | STA3 scheduling information | STA4 scheduling information | STA5 scheduling information | STA6 scheduling information | | HE-STF HE-LTF three-user MU-MIMO |
| SIGA: Quantity of pieces of RA included in a common domain of an HE-SIGB = 2 | RA-1 and RA-3 | STA1 scheduling information | STA2 scheduling information | STA3 scheduling information | STA4 scheduling information | STA5 scheduling information | STA6 scheduling information | STA7 scheduling information | |
| SIGA: Quantity of pieces of RA included in a common domain of an HE-SIGB = 2 | RA-4 and RA-6 | STA1 scheduling information | STA2 scheduling information | STA3 scheduling information | STA4 scheduling information | STA5 scheduling information | STA6 scheduling information | | |

FIG. 22

| BW bandwidth | BSS color basic service set color identifier | #sym HE-SIGB quantity of symbols in an HE-SIGB | MCS of HE-SIGB modulation and coding scheme | HE-SIGA CRC cyclic redundancy code in a SIGA | Quantity of pieces of RA included in a common domain of a SIGB-1 | Quantity of pieces of RA included in a common domain of a SIGB-2 | To-be-determined TBD |

FIG. 23

| BW bandwidth | BSS color basic service set color identifier | #sym HE-SIGB quantity of symbols in an HE-SIGB | MCS of HE-SIGB modulation and coding scheme | HE-SIGA CRC cyclic redundancy code in a SIGA | Quantity of pieces of RA included in a common domain of a SIGB-1 | To-be-determined TBD |

FIG. 24

| bitmap | Resource allocation indication information | STA1 scheduling information | STA2 scheduling information | STA3 scheduling information | ... |

| Common domain | Dedicated station domain |

FIG. 25

| HE-STF HE-LTF two-user MU-MIMO | HE-STF HE-LTF one user | HE-STF HE-LTF one user | HE-STF HE-LTF one user | HE-STF HE-LTF one user | HE-STF HE-LTF one user | HE-STF HE-LTF one user | HE-STF HE-LTF four-user MU-MIMO |
|---|---|---|---|---|---|---|---|
| | | STA7 scheduling information | | | | | STA7 scheduling information |
| STA6 scheduling information | | STA6 scheduling information | | STA6 scheduling information | | | STA6 scheduling information |
| STA5 scheduling information | | STA5 scheduling information | | STA5 scheduling information | | | STA5 scheduling information |
| STA4 scheduling information | | STA4 scheduling information | | STA4 scheduling information | | | STA4 scheduling information |
| STA3 scheduling information | | STA3 scheduling information | | STA3 scheduling information | | | STA3 scheduling information |
| STA2 scheduling information | | STA2 scheduling information | | STA2 scheduling information | | | STA2 scheduling information |
| STA1 scheduling information | | STA1 scheduling information | | STA1 scheduling information | | | STA1 scheduling information |
| 1100 RA-1 and RA-2 | | 0011 RA-3 and RA-4 | | 1100 RA-1 and RA-2 | | | 0011 RA-3 and RA-4 |
| SIGA: Quantity of pieces of RA included in a common domain of an HE-SIGB = 2 | | SIGA: Quantity of pieces of RA included in a common domain of an HE-SIGB = 2 | | SIGA: Quantity of pieces of RA included in a common domain of an HE-SIGB = 2 | | | SIGA: Quantity of pieces of RA included in a common domain of an HE-SIGB = 2 |

FIG. 26

| SIGA: SIGB mode indication | User number and RA-3 | STA1 scheduling information | STA2 scheduling information | STA3 scheduling information | STA4 scheduling information | STA5 scheduling information | STA6 scheduling information | HE-STF HE-LTF four-user MU-MIMO |
|---|---|---|---|---|---|---|---|---|
| SIGA: SIGB mode indication | User number and RA-4 | STA1 scheduling information | STA2 scheduling information | STA3 scheduling information | STA4 scheduling information | STA5 scheduling information | STA6 scheduling information | |
| SIGA: SIGB mode indication | User number and RA-3 | STA1 scheduling information | STA2 scheduling information | STA3 scheduling information | STA4 scheduling information | STA5 scheduling information | STA6 scheduling information | HE-STF HE-LTF one user / HE-STF HE-LTF one user / HE-STF HE-LTF one user / HE-STF HE-LTF one user / HE-STF HE-LTF one user / HE-STF HE-LTF one user |
| SIGA: SIGB mode indication | User number and RA4 | STA1 scheduling information | STA2 scheduling information | STA3 scheduling information | STA4 scheduling information | STA5 scheduling information | STA6 scheduling information | HE-STF HE-LTF two-user MU-MIMO |

FIG. 27

METHOD AND APPARATUS FOR TRANSMITTING WIRELESS LOCAL AREA NETWORK INFORMATION

CROSS-REFERENCE TO RELATED APPLICATIONS

This application is a continuation of U.S. application Ser. No. 15/908,866, filed on Mar. 1, 2018, which is a continuation of International Application No. PCT/CN2016/097646, filed on Aug. 31, 2016, which claims priority to Chinese Patent Application No. 201510555654.5, filed on Sep. 1, 2015, The disclosures of the aforementioned applications are hereby incorporated by reference in their entireties.

BACKGROUND

With development of the mobile Internet and popularization of intelligent terminals, data traffic increases rapidly. A wireless local area network (WLAN) becomes one of mainstream mobile broadband access technologies by virtue of advantages of a high rate and low costs.

To significantly improve a service transmission rate of a WLAN system, the next-generation Institute of Electrical and Electronics Engineers (IEEE) 802.11ax standard further uses an Orthogonal Frequency Division Multiple Access (OFDMA) technology on a basis of an existing Orthogonal Frequency Division Multiplexing (OFDM) technology. The OFDMA technology divides time-frequency resources of a wireless channel of an air interface into multiple orthogonal time-frequency resource units (RB, Resource Block). The RBs are shared in terms of time and are orthogonal in terms of a frequency field. In 802.11ax, a transmission bandwidth allocated to users is referred to as a resource unit, and therefore, is only represented by "resource unit" subsequently.

SUMMARY

Embodiments of the present invention provide a method for sending wireless local area network information, so as to reduce a peak-to-average power ratio.

According to one aspect, a method for sending a wireless local area network packet structure is provided, including:
determining a packet structure, where the packet structure comprises an HE-SIGA and an HE-SIGB, the HE-SIGA comprises indication information, and when a current transmission mode is a full bandwidth MU-MIMO transmission, the indication information is used to indicate a number of scheduled users, or when the current transmission mode is other transmission mode, the indication information is used to indicate a number of symbols in the HE-SIGB; and
sending the packet structure.

Correspondingly, a method for receiving a wireless local area network packet structure is provided, including:
receiving a packet structure, where the packet structure comprises an HE-SIGA and an HE-SIGB, the HE-SIGA comprises indication information, and when a current transmission mode is a full bandwidth MU-MIMO transmission, the indication information is used to indicate a number of scheduled users, or when the current transmission mode is other transmission mode, the indication information is used to indicate a number of symbols in the HE-SIGB; and
performing processing according to the number of the scheduled users or the number of the symbols in the HE-SIGB in the packet structure.

According to another aspect, a method for sending a wireless local area network packet structure is provided, including:
determining a packet structure, where the packet structure comprises an HE-SIGB, the HE-SIGB comprises a common field and a user specific field, the common field comprises information for resource unit(s) allocation, and the resource allocation information is used to indicate that there is no user scheduling information corresponding to a current resource unit in a subsequent user specific field; and
sending the packet structure.

Correspondingly, a method for receiving a wireless local area network packet structure is provided, including:
receiving a packet structure, where the packet structure comprises an HE-SIGB, the HE-SIGB comprises a common field and a user specific field, the common field comprises information for resource unit(s) allocation, and the resource allocation information is used to indicate that there is no user scheduling information corresponding to a current resource unit in a subsequent user specific field; and
performing processing according to the information for resource unit(s) allocation included in the packet structure.

According to still another aspect, a method for sending a wireless local area network packet structure is provided, including: determining a packet structure, where the packet structure comprises an HE-SIGA and an HE-SIGB, and the HE-SIGA comprises information for indicating a number of pieces of resource unit(s) allocation indication information RA included in a common field of the HE-SIGB; and
sending the packet structure.

Correspondingly, a method for receiving a wireless local area network packet structure is provided, including: receiving a packet structure, where the packet structure comprises an HE-SIGA and an HE-SIGB, and the HE-SIGA comprises information for indicating a number of pieces of resource unit(s) allocation indication information RA included in a common field of the HE-SIGB; and
performing processing according to the information about the number of pieces of the RA included in the packet structure.

In a next-generation wireless local area network, signaling overheads can be reduced by using the methods provided in the embodiments of the present invention.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

FIG. 5 is a simple schematic diagram of a data structure of a packet structure PPDU in a multi-user transmission mode according to an embodiment of the present invention;

FIG. 6 is a simple schematic diagram of an HE-SIG-A structure in a packet structure PPDU;

FIG. 7 is a possible structure of an HE-SIG-B in a packet structure PPDU;

FIG. 8 is a simple schematic diagram of a possible resource allocation manner (a common field) in a packet structure PPDU;

FIG. 10a is a simple schematic diagram of a scheduling information structure (user specific field) in a single-user mode;

FIG. 10b is a simple schematic diagram of a scheduling information structure (user specific field) in a multi-user mode;

FIG. 11 is a simple schematic diagram of a transmission mode of a preamble part at 80 MHz;

FIG. 12 is a simple schematic diagram of a transmission mode of an HE-SIGB part at 80 MHz;

FIG. 13, FIG. 14, and FIG. 15 each are simple schematic diagrams of content and a transmission mode of an HE-SIGA and an HE-SIGB;

FIG. 16 is a simple schematic diagram of a preferred structure of an HE-SIGA;

FIG. 17, FIG. 18, FIG. 19, FIG. 20, FIG. 21, and FIG. 22 each are simple schematic diagrams of content and a transmission mode of an HE-SIGA and an HE-SIGB;

FIG. 23 and FIG. 24 each are simple schematic diagrams of a preferred structure of an HE-SIGA;

FIG. 25, FIG. 26, and FIG. 27 each are simple schematic diagrams of content and a transmission mode of an HE-SIGA and an HE-SIGB;

DESCRIPTION OF EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

For ease of understanding, terms that possibly appear in the following embodiments are explained as follows:

| | |
|---|---|
| STA | Station or user |
| AP | Access point |
| UL | Uplink |
| DL | Downlink |
| OFDM | Orthogonal frequency division multiplexing |
| OFDMA | Orthogonal frequency division multiple access |
| MIMO | Multiple-input multiple-output |
| ID | Identifier |
| BSS | Basic service set |
| OBSS | Overlapped basic service set |
| HE-SIGA | High efficient signal field A |
| HE-SIGB | High efficient signal field B |
| HE-STF | High efficient short training field |
| HE-LTF | High efficient long training field |
| MCS | Modulation and coding scheme |
| NSTS | Number of space-time streams |
| BF | Beamforming |
| BCC | Binary convolutional code |
| LDPC | Low density parity code |
| PER | Packet error rate |
| LTE | Long Term Evolution |
| WiMax | Worldwide Interoperability for Microwave Access |
| WiFi | Wireless Fidelity |
| Bitmap | Bitmap |
| PPDU | physical layer (PHY) protocol data unit (cited from page 2 of IEEE 802.11ac-2013, approved 11 December 2013.) |

An access point (AP) may also be referred to as a wireless access point, a bridge, a hotspot, or the like, and may access a server or a communications network.

A station (STA) may also be referred to as a user, and may be a wireless sensor, a wireless communications terminal, or a mobile terminal, such as a mobile phone (or referred to as a "cellular" phone) supporting a WiFi communication function and a computer with a wireless communication function. For example, the station may be a portable, pocket-sized, handheld, computer built-in, wearable, or in-vehicle wireless communications apparatus that supports the WiFi communication function and exchanges communications data such as voice and data with a radio access network.

Figure 1:
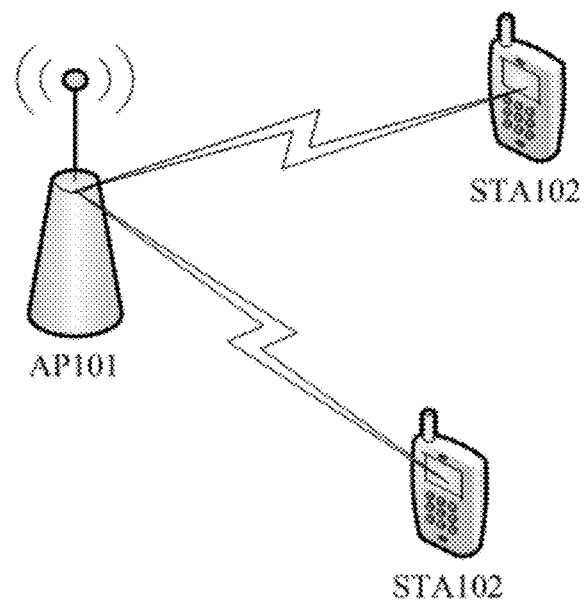
FIG. 1 is a simple schematic diagram of a wireless local area network according to an embodiment of the present invention.

Referring to FIG. 1, FIG. 1 is a diagram of a network architecture of a wireless local area network, including the foregoing AP 101 and at least one station STA 102. Various apparatuses in the foregoing system may comply with a standard protocol of a next-generation wireless local area network, such as 802.11ax.

Possible Resource Unit Sizes in 802.11ax

In 802.11ax, there are multiple resource unit sizes, including a resource unit size of 26 subcarriers, a resource unit size of 52 subcarriers, a resource unit size of 106 subcarriers, a resource unit size of 242 subcarriers, and the like.

Figure 2A:
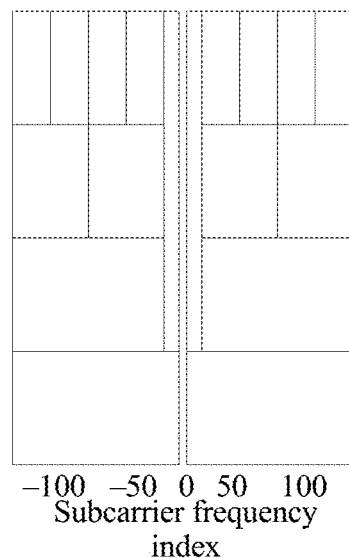
FIG. 2a and FIG. 2b are tone plans at a 20 MHz bandwidth in an OFDMA transmission mode according to an embodiment of the present invention.
Figure 2B:
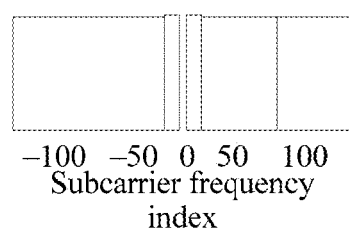

At a 20 MHz bandwidth, a resource unit size is limited to 26, 52, 106, or 242 subcarriers. As shown in FIG. 2a, a resource unit with the size of 26 in the center crosses direct current subcarriers, and the direct current subcarriers are shown as a small gap in the center of the FIG. 2a (subcarrier frequency indexes −1, 0, and 1). The first layer shows location of 9 resource units with the size of 26. The second layer show location of 4 resource units with the size of 52 and 1 resource unit with the size of 26. The third layer shows location distribution of 2 resource units with the size of 106 and 1 resource unit with the size of 26. The fourth layer show location of 1 resource unit with the size of 242, and the resource unit with the size of 242 is the full 20 MHz bandwidth. A tone allocation of a 20 MHz frequency domain may be a combination of any resource units shown in the four layers, occupying a frequency spectrum of 242 subcarriers. One example is shown in FIG. 2b, the 20 MHz bandwidth is allocated as four resource units (106+26+52+52). When performing scheduling, the AP can assign only one resource unit to each user, but may assign a same resource unit to multiple users. The users sharing one resource unit transmit data in spatial flows respectively, in a MU-MIMO (multi-user multiple-input multiple-output) manner.

Figure 3:
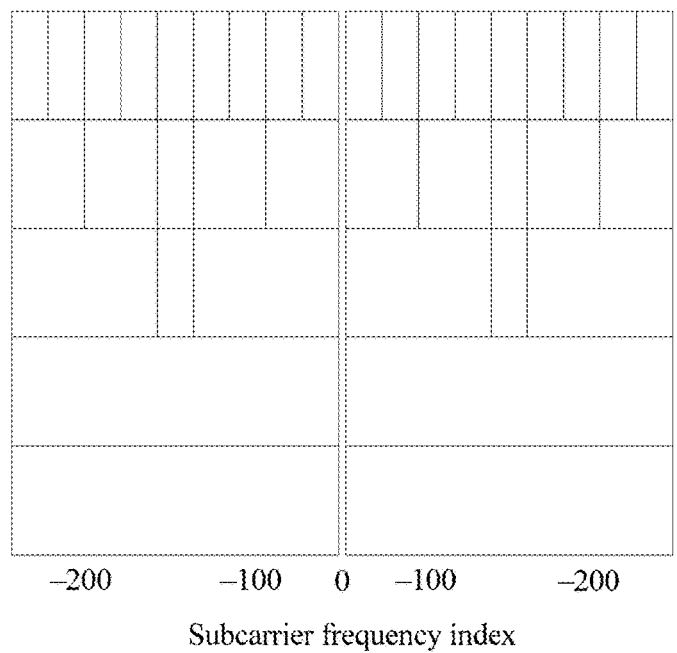
FIG. 3 and FIG. 4 are tone plans at different bandwidths in an OFDMA transmission mode according to an embodiment of the present invention.

At a 40 MHz bandwidth, a resource unit size is limited to 26, 52, 106, 242, or 484 subcarriers. As shown in FIG. 3, a small gap shown in the center are direct current subcarriers. The first layer shows location of 18 resource units with the size of 26. The second layer shows location of 8 resource units with the size of 52 and 2 resource units with the size of 26. The third layer shows location of 4 resource units with the size of 106 and 2 resource units with the size of 26. The fourth layer shows location of 2 resource units with the size of 242, and the resource unit with the size of 242 is a 20 MHz bandwidth. The fifth layer is one resource unit with the size of 484, and the resource unit with the size of 484 is a full 40 MHz bandwidth. A tone allocation of a 40 MHz frequency domain may be a combination of any resource units shown in the five layers, occupying a frequency spectrum of 484 subcarriers, and only one the resource unit can be assigned to each user.

Figure 4:
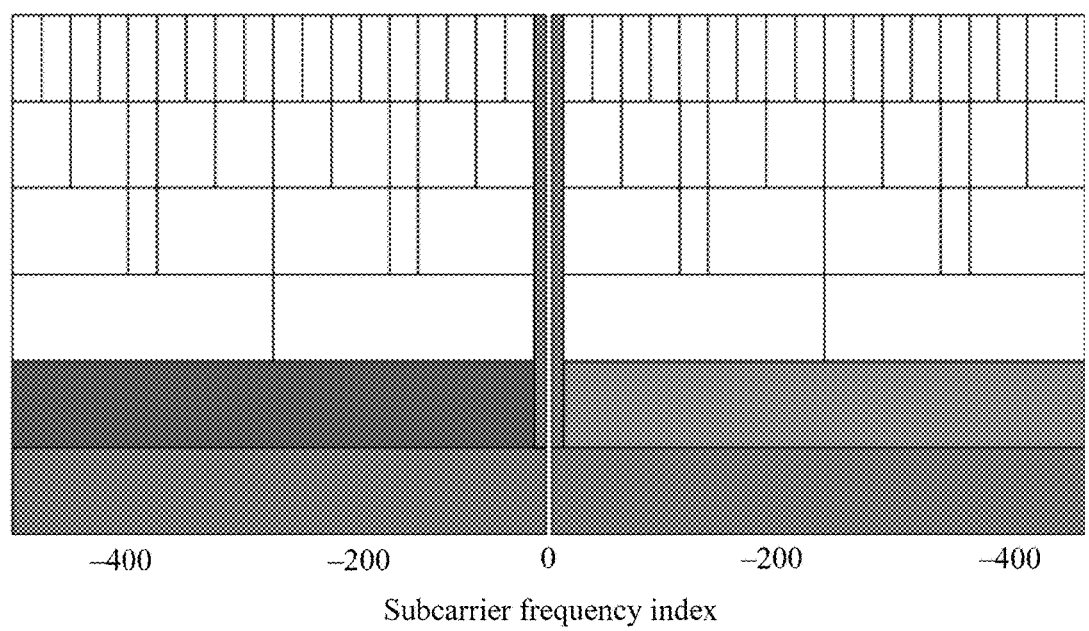

At an 80 MHz bandwidth, a resource unit size is limited to 26, 52, 106, 242, 484, or 996 subcarriers. As shown in FIG. 4, a tone allocation of the 80 MHz bandwidth is shown in six layers, a resource unit with the size of 26 in the center crosses direct current subcarriers, and a small gap in the center is shown as the direct current subcarriers. The first layer shows location of 37 resource units with the size of 26. The second layer shows location of 16 resource units with the size of 52 and five resource units with the size of 26. The third layer shows location of 8 resource units with the size of 106 and 5 resource units with the size of 26. The fourth layer shows location of 4 resource units with the size of 242 and 1 resource unit with the size of 26, and the resource unit with the size of 242 is a 20 MHz bandwidth. The fifth layer shows 2 resource units with the size of 484 and 1 resource unit with the size of 26, and the resource unit with the size of 484 is a 40 MHz bandwidth. The sixth layer shows location of one resource unit with the size of 996, and the resource unit with the size of 996 is an 80 MHz bandwidth. A tone allocation of a 80 MHz frequency domain may be a combination of any resource units shown in the five layers, occupying a frequency spectrum of 996 subcarriers, and only one resource unit an be assigned to each user.

Possible Packet Structure in 802.11ax

FIG. 5 is a possible packet structure (a packet structure PPDU in multi-user transmission) in 802.11ax, and shows that the AP simultaneously transmits data to multiple STAs by using multiple resource units in a DL (Downlink, downlink) OFDMA manner. Several STAs may also share a same resource unit, and transmit data in their spatial flows respectively in the MU-MIMO manner.

The packet structure in 802.11ax firstly comprises: a legacy preamble, that comprises a legacy short training field (L-STF), a legacy long training field (L-LTF), and a legacy signal field (L-SIG), to ensure backward compatibility, so that a STA of an earlier-version standard can receive and decode the legacy preamble. In addition, a repeated legacy signal field (Repeated L-SIG) is also included, which is used to perform automatic detection for 802.11ax and increase robustness of the L-SIG. An HE-SIG-A (high efficient signal field A) is used to carry information, such as a bandwidth and an AP identifier (AP ID, also referred to as BSS Color), that is in a current BSS (basic service set) and OBSS (Overlapped BSS, overlapped basic service set) and that is read by a STA, as shown in FIG. 6. An HE-SIG-B (high efficient signal field B) is mainly used to carry resource scheduling information that is in a current BSS and that is read by a STA. The following are an HE-STF (high efficient short training field) and an HE-LTF (high efficient long training field), which are respectively used to perform AGC (automatic gain control) and channel measurement of MIMO (Multiple Input Multiple Output,). The HE-LTF field may include multiple HE-LTF symbols, which are used to perform channel measurement for multiple space-time streams. The last is a Data part, and is used to bear a MAC frame.

Possible Resource Indication Manner (HE-SIGB Content) of Downlink Multi-User Transmission in 802.11ax As shown in FIG. 5, the AP allocates a full bandwidth into multiple resource units, and uses the multiple resource units to trans-ceive data with multiple STAs. For a STA to determine whether the STA itself is a target STA and for a target STA to determine a frequency location in which data is carried and a physical layer parameter for receiving data, the AP needs to indicate resource scheduling information. For downlink multi-user transmission, the HE-SIG-B generally comprises resource scheduling information of multiple users, to instruct multiple STAs to receive data. FIG. 7 is a possible structure of an HE-SIG-B, and the structure comprises a common field (common part) and a user specific field (dedicated part). The common field comprises some common information that all target STAs need to read, such as indication information of resource unit(s) allocation (Resource allocation Signaling, RA Signaling). The user specific field comprises scheduling information for a group of STAs assigned with a same resource unit to read, or scheduling information for each one STA to read.

The indication information of resource allocation in the common field may have multiple possible structures. One relatively high-efficiency manner is to store, indices for all possible combinations into a table, through storing each index and the corresponding combination of resource units. Multiple resource unit sizes are currently defined in 802.11ax, and comprises 26, 52, 106, 242, 484, 996, and the like according to a number of subcarriers (for details, refer to BACKGROUND 1.1.2). FIG. 8 shows all possible combination manners for OFDMA resource units at a full 20 MHz bandwidth. For 20 MHz, a resource unit size may be 26, 52, 106, and 242 subcarriers. There are totally 25 allocations, which correspond to 25 indices. Provided that the common part carries ceil(log 225)=5 bits, all possible cases of 20 MHz can be carried, where ceil represents rounding up. For a case with a full bandwidth being 40 MHz, 80 MHz, or 160 MHz, based on the multiple indices, an indication for each 20 MHz is performed respectively (that is, multiple pieces of RA Signaling).

Figure 9:
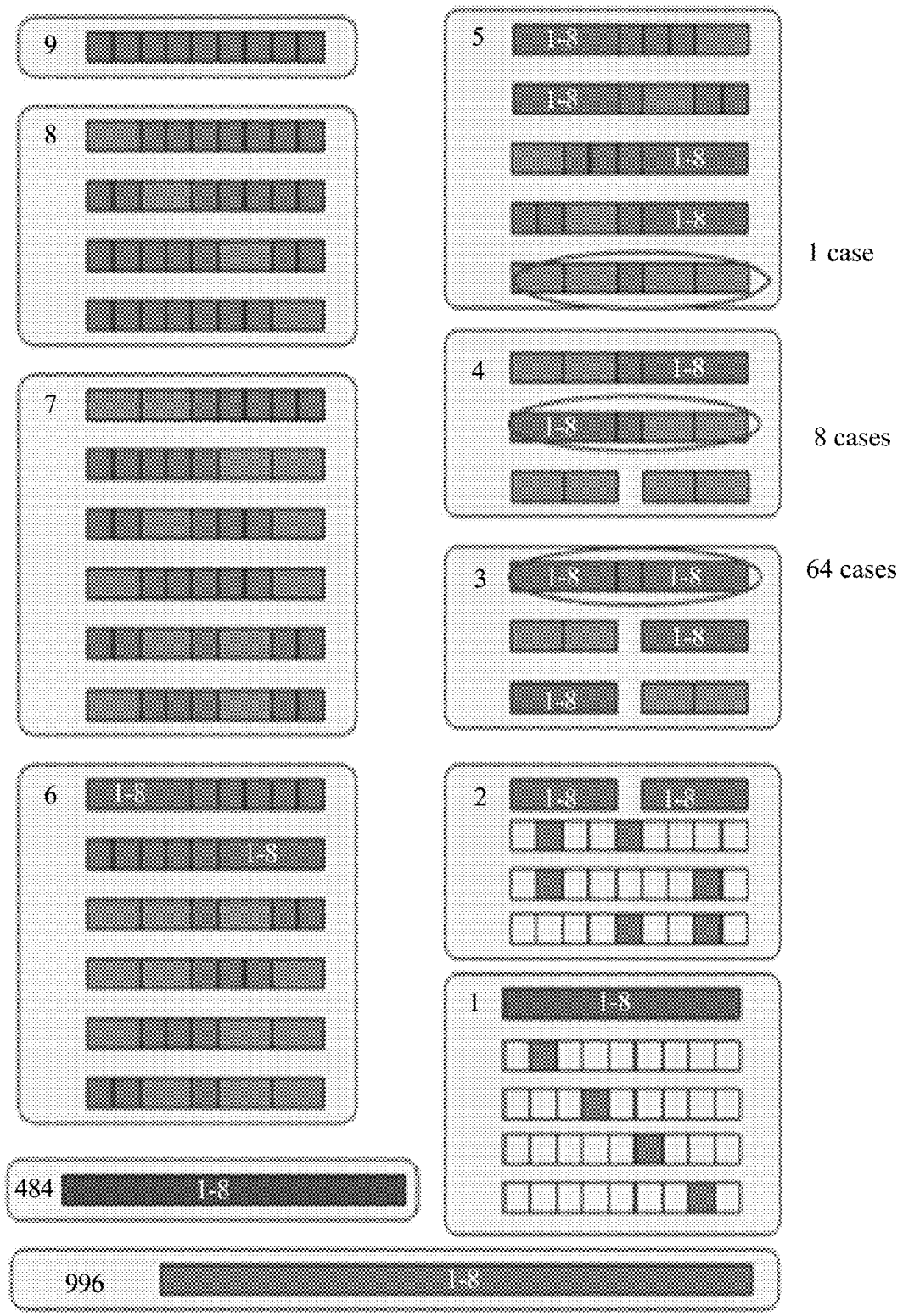
FIG. 9 is a simple schematic diagram of another possible resource allocation manner (a common field) in a packet structure PPDU.

In some other solutions, the OFDMA resource allocation indication also indicates a transmission situation of multi-user MIMO (Multiple-user MIMO, MU-MIMO), that is, when data for multiple users are included on one resource unit, the specific number of users is also indicated (as shown in FIG. 9). When a resource unit is sufficiently large, for example, comprises 106 subcarriers, multi-user transmission is further allowed on the resource unit by using MU MIMO. Therefore, a table that comprises a more comprehensive allocation manner is proposed in some embodiments, and compared with the former embodiment, requires more bits for indication the number of users; wherein resource units marked by 1-8 are resource units allowable for MU-MIMO transmission, and indices are respectively provided for each case with one to eight users in the table. Referring to FIG. 9, the resource units marked by 1-8 are included.

A table may be generated for the resource allocation manner in FIG. 9, also on a basis of 20 MHz. The table comprises an indication of a resource unit with a size greater than 242 (cases marked by dark green and red) in addition to an indication of a number of users on a resource unit allowable for MU-MIMO. For a case with a full bandwidth of 40 MHz, 80 MHz, or 160 MHz, based on the multiple indices, an indication for each 20 MHz is performed respectively (that is, multiple pieces of RA Signaling).

In the user specific field, each piece of user scheduling information has two possible structures, as shown in FIG. 10a and FIG. 10b. A structure in FIG. 10a represents a scheduling information structure in a single-user mode. The single-user mode means that a current STA exclusively occupies one resource unit. FIG. 10b represents a scheduling information structure in a multi-user mode. The multi-user mode means that a current STA does not exclusively occupy one resource unit, and some other STAs share one resource unit with the current STA in a MU-MIMO manner.

The structure in FIG. 10a comprises: a station identifier (STA ID) or a station partial identifier (STA PAID), a modulation and coding scheme (MCS for short), used to indicate a modulation and coding scheme, a number of space-time streams (NSTS for short), used to indicate a number of used space-time streams, a coding manner (Coding), used to indicate whether an LDPC coding manner is used, space time block coding (STBC for short), used to indicate whether STBC is used, and beamforming (TxBF), used to indicate whether a beamforming technology is used. In addition, the structure may also include a cyclic redundancy code (CRC for short), used to store a CRC check bit, and a tail bit (Tail), used to store a 6-bit tail of a binary convolutional code (Binary Convolution Code, BCC for short).

The structure in FIG. 10b comprises a station identifier (STA Identifier, STA ID) or a station partial identifier (STA PAID), a modulation and coding scheme (MCS for short), used to indicate a modulation and coding scheme, a location of the first space-time stream (first Stream index), used to indicate a sequence number of the used first space-time stream (because a STA only transmits data in a space-time stream in which the STA is located, a start location of the space-time stream of the STA needs to be learned), a number of space-time streams (NSTS for short), used to indicate a number of used space-time streams, and a coding manner (Coding), used to indicate whether an LDPC coding manner is used. In addition, the structure may also include a cyclic redundancy code (CRC for short), used to store a CRC check bit, and a tail bit (Tail), used to store a 6-bit tail of a binary convolutional code (BCC for short).

HE-SIGB Structure

When a transmission bandwidth is greater than 20 MHz, a preamble part needs to be transmitted over each 20 MHz. Parts comprising the legacy preamble, the repeated L-SIG, and the high efficient signal field A are duplicated and transmitted over each 20 MHz. The high efficient signal field B part uses a partial duplication mode. Transmission over 80 MHz is used as an example. A transmission mode of the preamble part is specifically shown in FIG. 11.

It may be seen that, as shown in FIG. 12, the HE-SIGB carries different content at an odd-numbered 20 MHz and at an even-numbered 20 MHz, but carries same content at each odd-numbered 20 MHz (a first 20 MHz and a third 20 MHz) and carries same content at each even-numbered 20 MHz (a second 20 MHz and a fourth 20 MHz). An HE-SIGB at an odd-numbered 20 MHz is denoted as SIGB-1, and an HE-SIGB at an even-numbered 20 MHz is denoted as SIGB-2. For content included in the SIGB-1 and the SIGB-2, refer to an introduction in BACKGROUND 1.1.4, comprises a common field and a user specific field. The SIGB-1 comprises indication information of resource allocation (RA signaling) over the first 20 MHz sub-channel and the third 20 MHz sub-channel and user scheduling information for the transmission over the first and the third 20 MHz sub-channel. The SIGB-2 comprises indication information of resource allocation (RA signaling) over the second 20 MHz sub-channel and the fourth 20 MHz sub-channel and user scheduling information for the transmission over the second and the fourth 20 MHz sub-channel. For a 20 MHz bandwidth transmission, only one HE-SIGB (SIGB-1) is comprised. For a 40 MHz bandwidth transmission, SIGB-1 and SIGB-2 are comprised, but both the SIGB-1 and the SIGB-2 comprises a resource allocation indication and user scheduling information over only one 20 MHz sub-channel. The SIGB-1 comprises a resource allocation indication and user scheduling information over the first 20 MHz (an odd-numbered 20 MHz), and the SIGB-2 comprises a resource allocation mode indication and user scheduling information over the second 20 MHz (an even-numbered 20 MHz).

In general, some solutions are needed to reduce overheads of the HE-SIGA or the HE-SIGB further.

Preferred Embodiment 1

In Preferred Embodiment 1, a part of an HE-SIGA field may be reused. Further, an indication of a number of users in the common field of the HE-SIGB may be omitted.

Referring to FIG. 6, generally, in an HE-SIGA structure, "#sym HE-SIGB" field is used to indicate a number of symbols in the HE-SIGB.

In Preferred Embodiment 1, when a current transmission mode is full bandwidth MU-MIMO or single-user transmission, "#sym HE-SIGB" field is used to indicate a number of currently scheduled users, and is no longer used to indicate the number of the symbols in the HE-SIGB. In this case, an common field of the HE-SIGB may not include information for indicating the number of the currently scheduled users. This can reduce some overheads.

In this solution, the HE-SIGA comprises an indication of MCS of the HE-SIGB, besides the "#sym HE-SIGB" field indicating the number of the currently scheduled users. In this way, when needed, the number of the symbols in the HE-SIGB may also be calculated out on a sending side or a receiving side according to the number of the currently scheduled users. For brevity, reusing the field "#sym HE-SIGB" field does not cause a loss of related information.

Specifically, a bit overhead of each piece of user scheduling information is fixed, therefore, when obtaining a "#sym HE-SIGB" indicating the number of the scheduled users, a receive end is capable to obtain a total bit overhead of the user scheduling information field. With reference to the MCS of HE-SIGB indicated in the HE-SIGA, the receive end is capable to obtain a number of HE-SIGB symbols occupied by the total user scheduling information field, and further accurately obtain a location in which the HE-SIGB ends.

Referring to FIG. 13, FIG. 13 is a preferred structure of an HE-SIGA/B in this embodiment.

The HE-SIGA comprises an indication for a non-OFDMA transmission and an indication for the number of scheduled users. The HE-SIGB may not include information for resource unit(s) allocation and may not include information about the number of the users.

It should be noted that Preferred Embodiment 1 is a special case for current transmission, that is, the current transmission is a full bandwidth MU-MIMO or a single-user transmission mode; or, it is a case that resource allocation indication information in a common field of a current HE-SIGB may be omitted. Specifically, for how to obtain that the current transmission is a special case, a method in which the HE-SIGA comprises a transmission mode indication may be used, or, other possible implementation methods may also be used, such as Preferred Embodiment 3 or 5 in the present invention. The transmission mode indication is used to indicate that the current transmission is an OFDMA transmission mode or a non-OFDMA transmission mode. The non-OFDMA transmission mode is a full bandwidth MU-MIMO, or a single-user transmission.

Specifically, in a full bandwidth MU-MIMO or a single-user transmission, the number of all users does not exceed eight. Therefore, this preferred embodiment has following examples.

Example 1

The "#sym HE-SIGB" field occupies 4 bits. A first two bits may be used to indicate the number of scheduled users in the SIGB-1, and the last two bits may be used to indicate the number of scheduled user in the SIGB-2. That is, the field may indicate the number of the user fields comprised in a user specific field of each SIGB. Referring to the foregoing introduction of the HE-SIGB (SIGB-1 and SIGB-2), the foregoing indication manner may be applicable to a case with a bandwidth greater than 20 MHz.

Example 2

Alternatively, all or partial bits of the "#sym HE-SIGB" field may be used to indicate a total number of scheduled users included in the HE-SIGB. Certainly, a number of bits occupied by the "#sym HE-SIGB" field is not limited to 4, and for example, may be 3. The foregoing method may be applicable to various cases of different bandwidths.

Example 3

Alternatively, all or partial bits of the "#sym HE-SIGB" field may be used to indicate the greater one, of the number of scheduled users in the SIGB-1, and the number of scheduled users in the SIGB-2. The foregoing method may be applicable to various cases of different bandwidths.

Preferred Embodiment 2

In Preferred Embodiment 2, a method is proposed and comprises a type of special information for resource unit(s) allocation (that is, special Resource Allocation, RA). The special RA is used to indicate that there is no corresponding user scheduling information field in a subsequent user specific field. An indication of the special RA may be plausibly understood as that the number of users scheduled on a current resource unit is zero, or, the current transmission is in an invalid resource allocation mode.

After obtaining the indication of the special resource allocation mode, a receive end accordingly obtains that for this 20 MHz subchannel, no user scheduling information fields exist in a user specific field corresponding to this 20 MHz subchannel. In this case, the receive end may ignore this resource allocation mode indication information.

FIG. 14 is used as an example for specific description. RA-1 indicates that no user scheduling information corresponding to RA-1 exists in a subsequent user specific field. It may be understood as indicating an authentic or a fake resource allocation mode. For example, a current resource unit is a resource unit of 40 MHz or a resource unit of 20 MHz, and the resource unit is assigned to "0" user. This RA-1 may be understood as an invalid resource allocation mode, and there is no subsequent user scheduling information field that corresponds to the RA-1. The receive end may directly ignore indication information of this invalid resource allocation mode. RA-2 comprises an authentic resource allocation mode, that is, a resource unit with a size of 484 is assigned for 4 users MU-MIMO transmission. In this way, the SIGB-1 only comprises 6 pieces of user scheduling information field for the third 20 MHz subchannel, and the SIGB-2 comprises 6 pieces of user scheduling information field for the second (together with the first) 20 MHz subchannel and the fourth 20 MHz subchannel. Compared with FIG. 15, the HE-SIGB in FIG. 14 reduces overheads of user scheduling information field in length.

The following describes an effect of the foregoing preferred embodiment by comparison with an example in FIG. 15. In the example, similarly, the AP assigns a 40 MHz subchannel (a 484 resource unit) for 4 users MU-MIMO transmission, assigns a 20 MHz subchannel (resource units with 52+26+26+26+26+26) for 6 users OFDMA transmission, and assigns a 20 MHz subchannel (a 242 resource unit) for 2 users MU-MIMO transmission. Referring to the RA indication method shown in the FIG. 9, if this preferred embodiment is not used, it may be obtained that RA-1 indicates that a 484 resource unit (40 MHz) is in use over the first 20 MHz, to which n1 users are assigned; RA-2 indicates that a 484 resource unit (40 MHz) is in use over the second 20 MHz, to which n2 users are assigned; RA-1/2 indicates the same resource unit with the size of 484 (40 MHz), and the number of users indicated in the RAs is n1+n2=4. The four users is assigned to use the resource unit with the size of 484, that is, two 20 MHz. Therefore, scheduling information of the 4 users may be considered as belonging to either 20 MHz subfield. RA-3 indicates that the third 20 MHz is allocated into six resource units, that is, resource units respectively with sizes of 52, 26, 26, 26, 26, and 26. Each resource unit is to be used by 1 user, and there are 6 users totally. RA-4 indicates that a resource unit with a size of 242 (20 MHz) is in use over the fourth 20 MHz, and 2 users are assigned.

In FIG. 15, because the RA indication does not include a case with zero users, the number n1 of users indicated by RA-1 and the number n2 of users indicated by RA-2 are at least greater than or equal to 1. In this way, at least one piece of user scheduling information, corresponding to RA-1 or RA-2, needs to be comprised in a user specific field. However, since there are 6 users scheduled on the third 20 MHz, SIGB-1 already necessarily comprises 6 pieces of user scheduling information field over the third 20 MHz; while an accumulative number of users over the first, the second, and the fourth 20 MHz is also 6. Consequently, by using the preferred embodiment, as shown in FIG. 14, the SIGB-1 only comprises scheduling information for the 6 users over the third 20 MHz, and the SIGB-2 comprises scheduling information for the remaining 6 users. In this way, a number of overall symbols in the HE-SIGB is smallest.

Further, the indication of the foregoing special resource allocation mode may use various possible specific indication methods.

For example, an RA indication uses the above-mentioned manner of performing an index indication according to a stored table. Such a table of resource allocation mode comprises one type of such a special resource allocation mode. An index corresponding to the above mode is transmitted to indicate that the current transmission is a special resource allocation mode. The index of the special mode may be an unused index.

For another example, for an RA indication that does not use a storage table manner, specifically, a special combination of resource indication bits, or one of the bits, may be used to indicate the foregoing special resource allocation mode.

Preferred Embodiment 3

In this preferred embodiment, the HE-SIGA comprises information for indicating a number of pieces of RA included in the common field of the HE-SIGB. Referring to FIG. 16, FIG. 16 is a simple schematic diagram of a preferred structure of the HE-SIGA.

After receiving the RA quantity indication information in the HE-SIGA, a receive end may obtain lengths of the common fields of the SIGB-1 and SIGB-2 according to the RA quantity indication information, and further, correctly decode the common fields of the SIGB-1 and SIGB-2.

With the information about the number of pieces of RA, an indication of a current transmission mode may be not included. In other words, the information about the number of pieces of RA may be used to indicate the current transmission mode. In other words, when a number of pieces of RA included in the HE-SIGA is zero, it indicates that the current transmission mode is a non-OFDMA transmission mode, that is, Full bandwidth MU-MIMO or single-user transmission. When the number of pieces of RA is greater than zero, and for example, is one or two, it indicates that the current transmission mode is an OFDMA transmission mode.

Referring to FIG. 17, FIG. 17 is a simple schematic diagram of a structure of the HE-SIGA/B indicated in Preferred Embodiment 3.

Referring to FIG. 18, FIG. 18 is a simple schematic diagram of another structure of the HE-SIGA/B indicated in Preferred Embodiment 3. Compared with a case in FIG. 19, it is obviously seen that signaling is reduced. In addition, because full 80 MHz is divided into two resource units with a size of 484 (40 MHz), mode indication information in the HE-SIGA is OFDMA, that is, the common fields of the SIGB-1 and the SIGB-2 need to include RA-1/3 and RA-2/4 according to a normal structure. The solution in FIG. 18 indicates that the number of pieces of RA included in the SIGB is one, the SIGB-1 only comprises RA-1, and the SIGB-2 only comprises RA-4. Therefore, the receive end may obtain allocation information of the current bandwidth.

Referring to FIG. 20, FIG. 20 is another structure of the HE-SIGA/B indicated in Preferred Embodiment 3. A resource unit(s) allocation situation in this embodiment is consistent with a resource unit(s) allocation situation indicated in the foregoing FIG. 14.

Preferably, the indication of "the number of pieces of RA included in the common field of the HE-SIGB" may occupy different quantities of bits at different bandwidths.

For example, when a current transmission bandwidth is 20 MHz or 40 MHz, the indication occupies one bit. Because the SIGB-1 and the SIGB-2 include only one piece of RA at most, the number of pieces of RA included in the common field falls into only two cases: zero and one.

For example, when a current transmission bandwidth is 80 MHz, the indication occupies two bits. Because the SIGB-1 and the SIGB-2 may include two pieces of RA at most, the number of pieces of RA included in the common field may fall into three cases: zero, one, and two.

For example, when a current transmission bandwidth is 160 MHz, the indication occupies three bits. Because the SIGB-1 and the SIGB-2 may include four pieces of RA at most, the number of pieces of RA included in the common field may fall into five cases: zero, one, two, three, and four.

For another example, when a transmission bandwidth is 80 MHz, two bits are used to indicate the number of pieces of RA included in the SIGB-1, and the number of pieces of RA may fall into four cases: zero, one, two, and three.

For another example, when a transmission bandwidth is 160 MHz, three bits are used to indicate the number of pieces of RA included in the SIGB-1, and the number of pieces of RA may fall into eight cases: zero, one, two, three, four, five, six, and seven.

More specifically, refer to FIG. 21 for the case in which the common field of the HE-SIGB comprises only two pieces of RA at 160 MHz.

Another possible structure is shown in FIG. 22.

Preferred Embodiment 3 may be combined with either of Preferred Embodiment 1 and Preferred Embodiment 2. For example, if the number of pieces of RA indicated in Preferred Embodiment 3 is zero, reuse of the "#sym HE-SIGB" field in the SIGA in Preferred Embodiment 1 may be adopted to indicate a number of scheduled users included in the user specific field of the HE-SIGB. For another example, if the number of pieces of RA indicated in Preferred Embodiment 3 is two, RA-1 may be made a special resource allocation mode according to a specific scheduling situation, so that the dedicated user field of the HE-SIGB has least overheads.

Specially and alternatively, for Preferred Embodiment 3, the quantities of pieces of RA included in the SIGB-1 and the SIGB-2 may be separately indicated in the HE-SIGA, as shown in FIG. 23. In this case, the SIGB-1 and the SIGB-2 may be different in length because the quantities of pieces of RA included may be different.

Specially and alternatively, for Preferred Embodiment 3, the number of pieces of RA included in the SIGB-1 or the SIGB-2 is indicated in the HE-SIGA, as shown in FIG. 24. If the number of pieces of RA included in the SIGB-1 is indicated, the number of pieces of RA included in the SIGB-2 equals a total quantity of pieces of RA at a current transmission bandwidth subtracted by the number of pieces of RA included in the SIGB-1. In this case, the SIGB-1 and the SIGB-2 may be different in length because the quantities of pieces of RA included may be different.

The foregoing embodiments reduce signaling overheads in the SIGB to some extent.

Preferred Embodiment 4

In this preferred embodiment, referring to FIG. 25, the HE-SIGB comprises information used for indicating a 20 MHz whose resource allocation information and user scheduling information are currently indicated in SIGB-1. The foregoing indication may use a bitmap manner. Each bit corresponds to one 20 MHz in a current transmission bandwidth, and each bit is used to indicate whether user scheduling information of the corresponding 20 MHz is included in a current SIGB.

Preferably, referring to FIG. 26, with reference to the indication in the HE-SIGA in Preferred Embodiment 3, FIG. 26 is an example of applying Preferred Embodiment 4. It may be seen that, in the example in FIG. 26, the common fields of the SIGB-1 and SIGB-2 separately include a 4-bit bitmap indication. Because there are four 20 MHz in 80 MHz, and each bit corresponds to one 20 MHz, the bit is used to indicate whether user scheduling information of the corresponding 20 MHz is included in the current SIGB. For example, when an indication of the bit in the bitmap is 1, it indicates that user scheduling information of the 20 MHz corresponding to the bit is included in the current SIGB; when the indication of the bit in the bitmap is 0, it indicates that the user scheduling information of the 20 MHz corresponding to the bit is not included in the current SIGB. Certainly, this also works when meanings of values 0 and 1 are reversed.

It may also be seen that, by using the method in Preferred Embodiment 4, the SIGB-1 and the SIGB-2 may no longer use the following manner: User scheduling information of odd-numbered 20 MHz is in the SIGB-1, and user scheduling information of even-numbered 20 MHz is in the SIGB-2.

Certainly, preferably, the user scheduling information of the odd-numbered 20 MHz may be included in the SIGB-1 and the user scheduling information of the even-numbered 20 MHz may be included in the SIGB-2. In this case, a bitmap in the common field of the HE-SIGB may have relatively few bits. For example, in an 80 MHz case, the SIGB-1 comprises two RA indications (RA at the first 20 MHz and the third 20 MHz) at most. Therefore, a 2-bit bitmap is sufficient, and the two bits respectively represent the first and the third 20 MHz in the SIGB-1, and respectively represent the second and the fourth 20 MHz in the SIGB-2.

For 160 MHz transmission, because there are eight 20 MHz, the bitmap has eight bits, and each bit corresponds to one 20 MHz. If it is still ensured that the SIGB-1 comprises indication information of the odd-numbered 20 MHz and the SIGB-2 comprises indication information of the even-numbered 20 MHz, only a 4-bit bitmap is required for the 160 MHz. It may be seen that, a length of the bitmap depends on a bandwidth indication in the HE-SIG-A.

A receive end receives an indication of the bitmap, as shown in FIG. 26. If "1100" is read from the SIGB-1, it indicates that user scheduling information of the first and the second 20 MHz channels is transmitted in the SIGB-1; if "0011" is read from the SIGB-2, it indicates that user scheduling information of the third and the fourth 20 MHz channels is transmitted in the SIGB-2.

Preferred Embodiment 5

In Preferred Embodiment 5, the HE-SIGA comprises SIGB mode indication information. The SIGB mode indication information is used to indicate an indication information type included in the HE-SIGB or is used to indicate an indication information combination in the common field of the HE-SIGB. The indication information type included in the HE-SIGB has the following example: The common field of the HE-SIGB comprises a resource allocation mode indication, or an indication of a number of scheduled users and a resource allocation mode indication, or two indications of quantities of scheduled users, or two resource allocation mode indications, or the like.

The SIGB mode indication information in Preferred Embodiment 5 may be included in a new field in the HE-SIGA, and may also be implicitly carried by using a polarity of the repeated L-SIG, or phase rotation of the HE-SIGA, or another manner.

As shown in FIG. 27, FIG. 27 is a simple schematic diagram of a structure of the HE-SIGA/B indicated in Preferred Embodiment 5.

Specifically, it is assumed that an indication of a number of users (user number) requires x1 bits, and an indication of a number of pieces of RA requires x2 bits. Therefore, the common field of the HE-SIGB has y possible different combination lengths, and an overhead of the foregoing SIGB mode indication is ceil(log 2 (y)).

Example

For a 20 MHz bandwidth, y equals 2 (a common field length equals 0, or the common field length equals x2) or y equals 2 (the common field length equals x1, or the common field length equals x2). Herein, the common field length equals 0, and this considers reference to the technology in Preferred Embodiment 1, and arranges an indication of the number of users in the "#sym HE-SIGB" field in the SIGA. When y equals 2, the SIGB mode indication occupies one bit. When the mode indication is a first value, the common field length equals 0 or x1, indicating that the current 20 MHz is used as a large resource unit in whole and is allocated to a group of users for MU-MIMO/SU transmission. When the mode indication is a second value, the common field length equals x2, indicating that the current 20 MHz is divided into multiple small resource units.

For a 40 MHz bandwidth, y equals 2 (a common field length equals 0, or the common field length equals x2) or y equals 2 (the common field length equals x1, or the common field length equals x2). Herein, the common field length equals 0, and this considers reference to the technology in Preferred Embodiment 1, and arranges an indication of the number of users in the "#sym HE-SIGB" field in the SIGA. When y equals 2, only one bit is required for the mode indication. When the mode indication is a first value, the common field length equals 0 or x1, indicating that the current 40 MHz is used as a large resource unit in whole and is allocated to a group of users for MU-MIMO/SU transmission. When the mode indication is a second value, another case is indicated and the corresponding common field length equals x2.

For an 80 MHz bandwidth, y equals 5 (including following several cases: a common field length equals 0, the common field length equals x2+x2, the common field length equals x1+x2, the common field length equals x2+x1, or the common field length equals x1+x1) or (the common field length equals x1, the common field length equals x2+x2, the common field length equals x1+x2, the common field length equals x2+x1, or the common field length equals x1+x1). When y equals 5, three bits are required for the mode indication. When the mode indication is a first value, the common field length equals 0 or x1, indicating that the current 80 MHz is used as a large resource unit in whole and is allocated to a group of users for MU-MIMO transmission. When the mode indication is a second value, the common field length equals x1+x1, indicating that the current 80 MHz is divided into two 40 MHz resource units, and each 40 MHz resource unit is allocated to a group of users for MU-MIMO/SU transmission. When the mode indication is a third value, the common field length equals x1+x2, indicating that the first 40 MHz of the current 80 MHz is used as one large resource unit and is allocated to a group of users for MU-MIMO/SU transmission. When the mode indication is a fourth value, the common field length equals x2+x1, indicating that the last 40 MHz of the current 80 MHz is used as one large resource unit and is allocated to a group of users for MU-MIMO/SU transmission. When the mode indication is a fifth value, another case is indicated and the corresponding common field length equals x2+x2. For example, each 20 MHz is used for MU-MIMO transmission, or partial 20 MHz is used for MU-MIMO transmission and partial 20 MHz is used for OFDMA transmission, or the like. A case shown in FIG. 27 is a case that the common field length is x1+x2.

The foregoing several cases of the common field length that are separated by a comma in the brackets, for example, y equals 2 (the common field length equals 0, or the common field length equals x2), indicate that the common field of the HE-SIGB has two possible different combination lengths, and one is that the common field length is 0, and the other is that the common field length is x2. Other similar parts are not repeatedly described.

It should be noted that, in Preferred Embodiment 5, the HE-SIGA may include an indication about whether a current transmission mode is OFDMA or a non-OFDMA transmission mode. In this case, the mode indication in Preferred Embodiment 5 only needs an indication overhead of ceil(log 2 (y−1)) bits.

Correspondingly, another embodiment provides an apparatus for processing a wireless local area network packet structure (not shown), and the apparatus is applied to a wireless local area network that uses the OFDMA technology, comprises a processing unit, and is configured to execute the methods of the foregoing embodiments. For a structure and content of a specific frame, refer to the foregoing embodiments and details are not described herein. The processing unit may be a general purpose processor, a digital signal processor, an application-specific integrated circuit, a field programmable gate array or another programmable logic device, a discrete gate or a transistor logic device, or a discrete hardware component, and may implement or execute various methods, steps, and logic block diagrams disclosed in the embodiments of the present invention. The general purpose processor may be a microprocessor, any conventional processor, or the like. The steps of the method disclosed with reference to the embodiments of the present invention may be directly performed by a hardware processor, or may be performed by using a combination of hardware in the processor and a software module. It may be easily understood that, the foregoing processing apparatus of an HE-LTF may be located in an access point or a station.

Figure 28:
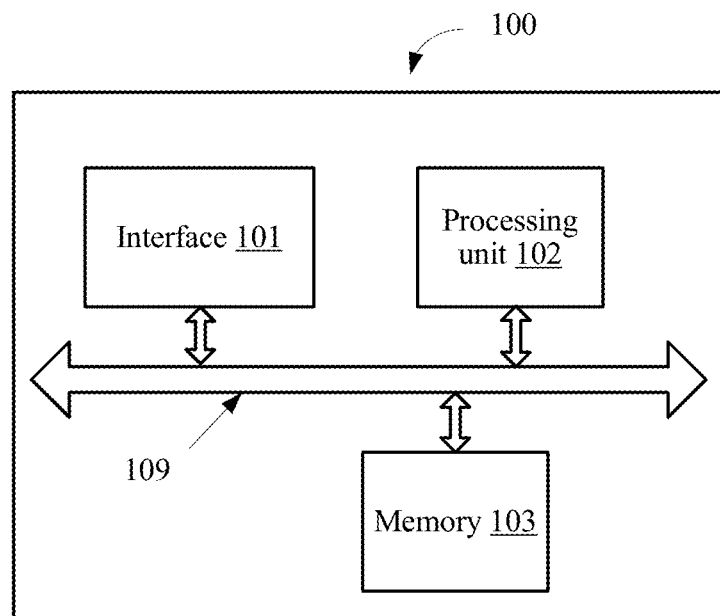
FIG. 28 is a block diagram of an access point according to an embodiment of the present invention.

FIG. 28 is a block diagram of an access point according to another embodiment of the present invention. The access point in FIG. 28 comprises an interface 101, a processing unit 102, and a memory 103. The processing unit 102 controls an operation of the access point 100. The memory 103 may include a read-only memory and a random access memory, and provides an instruction and data for the processing unit 102. A part of the memory 103 may further include a nonvolatile random access memory (NVRAM). All components of the access point 100 are coupled together by using a bus system 109, and in addition to a data bus, the bus system 109 further comprises a power bus, a control bus, and a status signal bus. However, for clarity of description, various buses are marked as the bus system 109 in FIG. 15.

The methods for sending the foregoing various frames disclosed in the foregoing embodiments of the present invention may be applied to the processing unit 102, or implemented by the processing unit 102. In an implementation process, each step of the foregoing methods may be completed by means of an integrated logic circuit of hardware in the processing unit 102 or an instruction in a software form. The processing unit 102 may be a general purpose processor, a digital signal processor, an application-specific integrated circuit, a field programmable gate array or another programmable logic device, a discrete gate or a transistor logic device, or a discrete hardware component, and may implement or execute various methods, steps, and logic block diagrams disclosed in the embodiments of the present invention. The general purpose processor may be a microprocessor, any conventional processor, or the like. The steps of the method disclosed with reference to the embodiments of the present invention may be directly performed by a hardware processor, or may be performed by using a combination of hardware in the processor and a software module. The software module may be located in a mature storage medium in the field, such as a random access memory, a flash memory, a read-only memory, a programmable read-only memory, an electrically-erasable programmable memory, or a register. The storage medium is located in the memory 103. The processing unit 102 reads information in the memory 103, and completes the steps of the foregoing methods with reference to the hardware of the processing unit 102.

Figure 29:
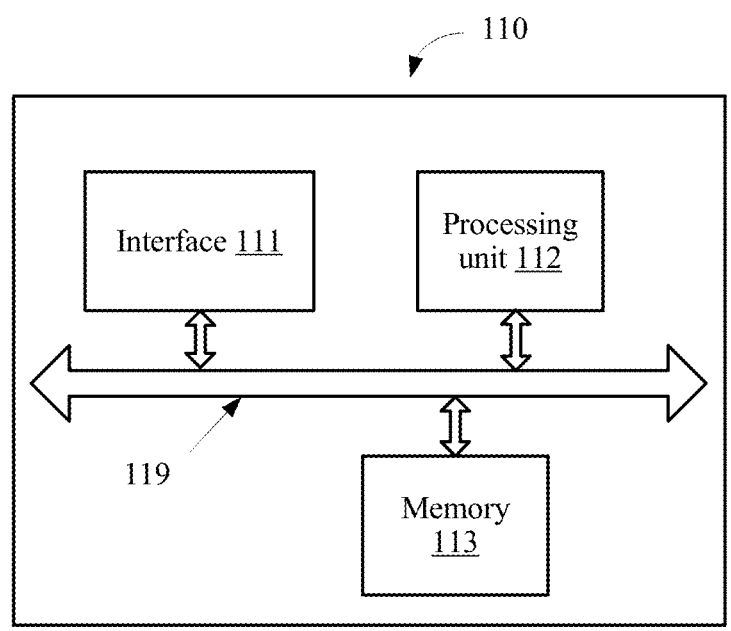
FIG. 29 is a block diagram of a station according to an embodiment of the present invention.

FIG. 29 is a block diagram of a station according to another embodiment of the present invention. The station comprises an interface 111, a processing unit 112, and a memory 113. The processing unit 112 controls an operation of the station 110. The memory 113 may include a read-only memory and a random access memory, and provides an instruction and data for the processing unit 112. A part of the memory 113 may further include a nonvolatile random access memory (NVRAM). All components of the station 110 are coupled together by using a bus system 119, and in addition to a data bus, the bus system 119 further comprises a power bus, a control bus, and a status signal bus. However, for clarity of description, various buses are marked as the bus system 119 in FIG. 16.

The methods for receiving the foregoing various frames disclosed in the foregoing embodiments of the present invention may be applied to the processing unit 112, or implemented by the processing unit 112. In an implementation process, each step of the foregoing methods may be completed by means of an integrated logic circuit of hardware in the processing unit 112 or an instruction in a software form. The processing unit 112 may be a general purpose processor, a digital signal processor, an application-specific integrated circuit, a field programmable gate array or another programmable logic device, a discrete gate or a transistor logic device, or a discrete hardware component, and may implement or execute various methods, steps, and logic block diagrams disclosed in this embodiment of the present invention. The general purpose processor may be a microprocessor, any conventional processor, or the like. The steps of the method disclosed with reference to the embodiments of the present invention may be directly performed by a hardware processor, or may be performed by using a combination of hardware in the processor and a software module. The software module may be located in a mature storage medium in the field, such as a random access memory, a flash memory, a read-only memory, a programmable read-only memory, an electrically-erasable programmable memory, or a register. The storage medium is located in the memory 113. The processing unit 112 reads information in the memory 113, and completes the steps of the foregoing methods with reference to the hardware of the processing unit 112.

Specifically, the memory 113 stores received information that enables the processing unit 112 to execute the methods mentioned in the foregoing embodiments.

It should be understood that "an embodiment" or "an embodiment" mentioned in the whole specification does not mean that particular features, structures, or characteristics related to the embodiment are included in at least one embodiment of the present invention. Therefore, "in an embodiment" or "in an embodiment" appearing throughout the specification does not refer to a same embodiment. In addition, these particular features, structures, or characteristics may be combined in one or more embodiments by using any appropriate manner. Sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present invention, "B corresponding to A" indicates that B is associated with A, and B may be determined according to A. However, it should further be understood that determining A according to B does not mean that B is determined according to A only; that is, B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is only an example. For example, the unit division is only logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium comprises a computer storage medium and a communications medium, where the communications medium comprises any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital STA line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk (Disk) and disc (disc) used by the present invention comprises a compact disc CD, a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is only example embodiments of the technical solutions of the present invention, but is not intended to limit the protection scope of the present invention. Any modification, equivalent replacement, or improvement made without departing from the principle of the present invention shall fall within the protection scope of the present invention.

What is claimed is:

1. A method for transmitting a packet structure in a wireless local area network, comprising:
   constructing a packet structure, wherein the packet structure comprises a High Efficient Signal Field B (HE-SIGB), wherein the HE-SIGB comprises a first HE-SIGB content which is carried at each odd-numbered 20 MHz sub-channel, and a second HE-SIGB content which is carried at each even-numbered 20 MHz sub-channel;
   wherein the first HE-SIGB content comprises a first common field and a first user specific field; wherein the first common field comprises one or more first resource allocations (RA), and each of the first RAs indicates one or more resource units which are allocated in one odd-numbered 20 MHz sub-channel; wherein the first user specific field comprises one or more first user scheduling information subfields, each of the one or more first user scheduling information subfields comprises information of one station (STA), wherein the STA is scheduled on one of the one or more resource units which are indicated by the one or more first RAs;
   wherein the second HE-SIGB content comprises a second common field and a second user specific field; wherein the second common field comprises one or more second resource allocations (RA), and each of the second RAs indicates one or more resource units which are allocated in one even-numbered 20 MHz sub-channel; wherein the second user specific field comprises one or more second user scheduling information subfields, each of the one or more second user scheduling information subfields comprises information of one STA, wherein the STA is scheduled on one of the one or more resource units which are indicated by the one or more second RAs;
   wherein one of the one or more first RAs indicates a specific resource unit and indicates that in the first user specific field a number of a first user scheduling information subfield for the specific resource unit is 0; or
   wherein one of the one or more second RAs indicates a specific resource unit and indicates that in the second user specific field a number of a second user scheduling information subfield for the specific resource unit is 0;
   transmitting the packet structure.

2. The method according to the claim 1,
   each of the one or more first RAs and each of the one or more second RAs is one of a multiple of defined or stored indexes.

3. The method according to the claim 1,
   the specific resource unit is equal to or larger than 20 MHz channel.

4. The method according to claim 3, wherein the specific resource unit is a resource unit with a size of 242 subcarriers or a size of 484 subcarriers.

5. The method according to claim 1, wherein a bandwidth for transmitting the packet structure is 40 MHz, 80 MHz, or 160 MHz, wherein,
   in the 40 MHz bandwidth transmission, the odd-numbered 20 MHz sub-channel is the first 20 MHz channel, the even-numbered 20 MHz channel is the second 20 MHz channel;
   in the 80 MHz bandwidth transmission, the odd-numbered 20 MHz sub-channels are the first 20 MHz and the third 20 MHz sub-channels, the even-numbered 20 MHz sub-channels are the second 20 MHz and the fourth 20 MHz sub-channel;
   in the 160 MHz bandwidth transmission, the odd-numbered 20 MHz sub-channels are the first 20 MHz, the third 20 MHz, the fifth and the seventh 20 MHz sub-channels, the even-numbered 20 MHz sub-channels are the second 20 MHz, the fourth 20 MHz, the sixth and the eighth 20 MHz sub-channel.

6. A method for receiving a packet structure in a wireless local area network, comprising:
   receiving a packet structure, wherein the packet structure comprises a High Efficient Signal Field B (HE-SIGB), wherein the HE-SIGB comprises a first HE-SIGB content which is carried at each odd-numbered 20 MHz sub-channel, and a second HE-SIGB content which is carried at each even-numbered 20 MHz sub-channel;
   wherein the first HE-SIGB content comprises a first common field and a first user specific field; wherein the first common field comprises one or more first resource allocations (RA), and each of the first RAs indicates one or more resource units which are allocated in one odd-numbered 20 MHz sub-channel; wherein the first user specific field comprises one or more first user scheduling information subfields, each of the one or more first user scheduling information subfields comprises information of one station (STA), wherein the STA is scheduled on one of the one or more resource units which are indicated by the one or more first RAs;
   wherein the second HE-SIGB content comprises a second common field and a second user specific field; wherein the second common field comprises one or more second resource allocations (RA), and each of the second RAs indicates one or more resource units which are allocated in one even-numbered 20 MHz sub-channel; wherein the second user specific field comprises one or more second user scheduling information subfields, each of the one or more second user scheduling information subfields comprises information of one STA, wherein the STA is scheduled on one of the one or more resource units which are indicated by the one or more second RAs;
   wherein one of the one or more first RAs indicates a specific resource unit and indicates that in the first user specific field a number of a first user scheduling information subfield for the specific resource unit is 0; or
   wherein one of the one or more second RAs indicates a specific resource unit and indicates that in the second user specific field a number of a second user scheduling information subfield for the specific resource unit is 0;
   processing the packet structure.

7. The method according to the claim 6,
   each of the one or more first RAs and each of the one or more second RAs is one of a multiple of defined or stored indexes.

8. The method according to the claim 6,
   the specific resource unit is equal to or larger than 20 MHz channel.

9. The method according to claim 3, wherein the specific resource unit is a resource unit with a size of 242 subcarriers or a size of 484 subcarriers.

10. The method according to claim 1, wherein a bandwidth for transmitting the packet structure is 40 MHz, 80 MHz, or 160 MHz, wherein,
    in the 40 MHz bandwidth transmission, the odd-numbered 20 MHz sub-channel is the first 20 MHz channel, the even-numbered 20 MHz channel is the second 20 MHz channel;
    in the 80 MHz bandwidth transmission, the odd-numbered 20 MHz sub-channels are the first 20 MHz and the third 20 MHz sub-channels, the even-numbered 20 MHz sub-channels are the second 20 MHz and the fourth 20 MHz sub-channel;

in the 160 MHz bandwidth transmission, the odd-numbered 20 MHz sub-channels are the first 20 MHz, the third 20 MHz, the fifth and the seventh 20 MHz sub-channels, the even-numbered 20 MHz sub-channels are the second 20 MHz, the fourth 20 MHz, the sixth and the eighth 20 MHz sub-channel.

11. An apparatus for transmitting a packet structure in a wireless local area network, comprising:
a processor and a non-transitory memory, wherein the memory stores instructions for the processor to:
construct a packet structure, wherein the packet structure comprises a High Efficient Signal Field B (HE-SIGB), wherein the HE-SIGB comprises a first HE-SIGB content which is carried at each odd-numbered 20 MHz sub-channel, and a second HE-SIGB content which is carried at each even-numbered 20 MHz sub-channel;
wherein the first HE-SIGB content comprises a first common field and a first user specific field; wherein the first common field comprises one or more first resource allocations (RA), and each of the first RAs indicates one or more resource units which are allocated in one odd-numbered 20 MHz sub-channel; wherein the first user specific field comprises one or more first user scheduling information subfields, each of one or more the first user scheduling information subfields comprises information of one station (STA), wherein the STA is scheduled on one of the one or more resource units which are indicated by the one or more first RAs;
wherein the second HE-SIGB content comprises a second common field and a second user specific field; wherein the second common field comprises one or more second resource allocations (RA), and each of the second RAs indicates one or more resource units which are allocated in one even-numbered 20 MHz sub-channel; wherein the second user specific field comprises one or more second user scheduling information subfields, each of the one or more second user scheduling information subfields comprises information of one STA, wherein the STA is scheduled on one of the one or more resource units which are indicated by the one or more second RAs;
wherein one of the one or more first RAs indicates a specific resource unit and indicates that in the first user specific field a number of a first user scheduling information subfield for the specific resource unit is 0; or
wherein one of the one or more second RAs indicates a specific resource unit and indicates that in the second user specific field a number of a second user scheduling information subfield for the specific resource unit is 0; and
transmit the packet structure.

12. The apparatus according to the claim 11,
each of the one or more first RAs and each of the one or more second RAs is one of a multiple of defined or stored indexes.

13. The apparatus according to the claim 11,
the specific resource unit is equal to or larger than 20 MHz channel.

14. The apparatus according to claim 13, wherein the specific resource unit is a resource unit with a size of 242 subcarriers or a size of 484 subcarriers.

15. The apparatus according to claim 11, wherein a bandwidth for transmitting the packet structure is 40 MHz, 80 MHz, or 160 MHz, wherein, in the 40 MHz bandwidth transmission, the odd-numbered 20 MHz sub-channel is the first 20 MHz channel, the even-numbered 20 MHz channel is the second 20 MHz channel;
in the 80 MHz bandwidth transmission, the odd-numbered 20 MHz sub-channels are the first 20 MHz and the third 20 MHz sub-channels, the even-numbered 20 MHz sub-channels are the second 20 MHz and the fourth 20 MHz sub-channel;
in the 160 MHz bandwidth transmission, the odd-numbered 20 MHz sub-channels are the first 20 MHz, the third 20 MHz, the fifth and the seventh 20 MHz sub-channels, the even-numbered 20 MHz sub-channels are the second 20 MHz, the fourth 20 MHz, the sixth and the eighth 20 MHz sub-channel.

16. An apparatus for receiving a packet structure in a wireless local area network, comprising:
a processor and a non-transitory memory, wherein the memory stores instructions for the processor to:
receive a packet structure, wherein the packet structure comprises a High Efficient Signal Field B (HE-SIGB), wherein the HE-SIGB comprises a first HE-SIGB content which is carried at each odd-numbered 20 MHz sub-channel, and a second HE-SIGB content which is carried at each even-numbered 20 MHz sub-channel;
wherein the first HE-SIGB content comprises a first common field and a first user specific field; wherein the first common field comprises one or more first resource allocations (RA), and each of the first RAs indicates one or more resource units which are allocated in one odd-numbered 20 MHz sub-channel; wherein the first user specific field comprises one or more first user scheduling information subfields, each of the one or more first user scheduling information subfields comprises information of one station (STA), wherein the STA is scheduled on one of the one or more resource units which are indicated by the one or more first RAs;
wherein the second HE-SIGB content comprises a second common field and a second user specific field; wherein the second common field comprises one or more second resource allocations (RA), and each of the second RAs indicates one or more resource units which are allocated in one even-numbered 20 MHz sub-channel; wherein the second user specific field comprises one or more second user scheduling information subfields, each of the one or more second user scheduling information subfields comprises information of one STA, wherein the STA is scheduled on one of the one or more resource units which are indicated by the one or more second RAs;
wherein one of the one or more first RAs indicates a specific resource unit and indicates that in the first user specific field a number of a first user scheduling information subfield for the specific resource unit is 0; or
wherein one of the one or more second RAs indicates a specific resource unit and indicates that in the second user specific field a number of a second user scheduling information subfield for the specific resource unit is 0;
process the packet structure.

17. The apparatus according to the claim 16,
each of the one or more first RAs and each of the one or more second RAs is one of a multiple of defined or stored indexes.

18. The apparatus according to the claim 16,
the specific resource unit is equal to or larger than 20 MHz channel.

19. The apparatus according to claim 18, wherein the specific resource unit is a resource unit with a size of 242 subcarriers or a size of 484 subcarriers.

20. The apparatus according to claim 16, wherein a bandwidth for transmitting the packet structure is 40 MHz, 80 MHz, or 160 MHz, wherein,
- in the 40 MHz bandwidth transmission, the odd-numbered 20 MHz sub-channel is the first 20 MHz channel, the even-numbered 20 MHz channel is the second 20 MHz channel;
- in the 80 MHz bandwidth transmission, the odd-numbered 20 MHz sub-channels are the first 20 MHz and the third 20 MHz sub-channels, the even-numbered 20 MHz sub-channels are the second 20 MHz and the fourth 20 MHz sub-channel;
- in the 160 MHz bandwidth transmission, the odd-numbered 20 MHz sub-channels are the first 20 MHz, the third 20 MHz, the fifth and the seventh 20 MHz sub-channels, the even-numbered 20 MHz sub-channels are the second 20 MHz, the fourth 20 MHz, the sixth and the eighth 20 MHz sub-channel.

* * * * *